(12) United States Patent
Dunnahoe (10) Patent No.: US 10,556,296 B2
(45) Date of Patent: Feb. 11, 2020

(54) METHOD AND APPARATUS FOR SEAM DRESSING

(71) Applicant: Hard Metal Advantage, LLC, New Iberia, LA (US)

(72) Inventor: Duane C. Dunnahoe, New Iberia, LA (US)

(*) Notice: Subject to any disclaimer, the term of this patent is extended or adjusted under 35 U.S.C. 154(b) by 33 days.

(21) Appl. No.: 15/827,157

(22) Filed: Nov. 30, 2017

(65) Prior Publication Data

US 2018/0147672 A1 May 31, 2018

Related U.S. Application Data

(60) Provisional application No. 62/428,278, filed on Nov. 30, 2016.

(51) Int. Cl.

| | |
|---|---|
| *B24B 23/02* | (2006.01) |
| *B23K 31/10* | (2006.01) |
| *B08B 9/047* | (2006.01) |
| *B08B 9/023* | (2006.01) |
| *E21B 17/20* | (2006.01) |

(52) U.S. Cl.
CPC ............. *B23K 31/10* (2013.01); *B08B 9/023* (2013.01); *B08B 9/047* (2013.01); *E21B 17/20* (2013.01)

(58) Field of Classification Search
CPC ................................ B24B 23/02; B24B 23/00
USPC ............................................ 451/359, 27, 51
See application file for complete search history.

(56) References Cited

U.S. PATENT DOCUMENTS

| | | | | |
|---|---|---|---|---|
| 4,246,728 A | * | 1/1981 | Leasher | .................. B24B 9/007 15/104.04 |
| 5,899,795 A | * | 5/1999 | Penza | .................. B23D 79/023 451/61 |
| 6,101,696 A | * | 8/2000 | Carter | .................... B21C 37/30 29/90.01 |
| 6,961,974 B1 | * | 11/2005 | Goolsby, Jr. | ............. B08B 1/04 15/104.04 |

* cited by examiner

*Primary Examiner* — Robert A Rose
(74) *Attorney, Agent, or Firm* — Ted M. Anthony; Sarah B. Dupont (57) ABSTRACT

A seam ripping assembly for use in preparing a coiled tubing operation in a production well, such as, for example, in the oil and gas industry. More particularly, the present invention pertains to a method and apparatus for seam dressing that can be used to efficiently remove a weld seam along an inner diameter on a section of coiled tubing, thereby allowing a coil connector to then be able to attach to an end of said section of coiled tubing.

9 Claims, 9 Drawing Sheets

METHOD AND APPARATUS FOR SEAM DRESSING

BACKGROUND OF THE INVENTION

Field of the Invention

The present invention pertains to a seam ripping device for use in preparing a coiled tubing operation in a production well, such as, for example, in the oil and gas industry. More particularly, the present invention pertains to a method and apparatus for seam dressing that can be used in removing a weld seam along an inner and/or outer surface on a section of coiled tubing, thereby allowing a coil connector to then be able to attach to an end of said section of coiled tubing. More particularly still, the present invention pertains to a more efficient seam dressing tool, thereby being able to remove a weld seam within an inner and/or outer surface of a section of coiled tubing in a substantially faster manner, thus resulting in a relatively easy to use and inexpensive operation.

Brief Description of the Prior Art

Standard rotary drilling rigs are typically comprised of a supportive rig floor, a derrick extending vertically above said rig floor, and a traveling block that can be raised and lowered within said derrick. During drilling operations, this rig equipment is often used to insert and remove tubular goods from a wellbore situated under the derrick which extends into subterranean formations.

During downhole well operations, pipe (such as, for example, drill pipe, tubing, workstrings and the like) is typically inserted in wellbore, and removed from such wellbore, in a number of sections of roughly equal length. These pipe sections, commonly referred to as "joints," are typically installed one at a time, and screwed together or otherwise connected end-to-end using threaded connections in order to make a roughly continuous length of pipe. According to industry convention, a joint of pipe typically comprises a male or "pin-end" threaded connection at its bottom end, and a female or "box-end" threaded connection at its upper end; the threaded pin-end connection from one pipe joint can be connected to a threaded box-end connection of an adjacent pipe joint in order to mate or join said pipe joints together.

Continuous or "coiled" tubing represents an alternative to conventional jointed pipe. Such coiled tubing typically utilizes a continuous length, up to 10,000 feet or more, of flexible tubing that is stored or wound on a reel. Unlike conventional jointed pipe, such coiled tubing can be translated in and out of a wellbore in a virtually continuous manner without the need to continually connect and/or disconnect individual pipe sections.

Coiled tubing can be used to conduct numerous downhole operations. For example, coiled tubing can be concentrically inserted into an existing wellbore in order to clean out sand or other debris from such well. Further, a fluid activated tool can be attached to the distal end of the coiled tubing in order to perform work downhole; typically, pressurized drilling fluid can be pumped through the coiled tubing to actuate the downhole tool. By way of illustration, a mud motor and drill bit can be attached to the distal end of coiled tubing and lowered into the borehole as the coiled tubing is spooled off a reel. As the mud motor extends deeper into the wellbore, pressurized drilling fluid drives the hydraulic mud motor which, in turn, rotates the drill bit downhole.

Although different manufacturing methods can be employed, coiled tubing typically comprises an electric-welded tube manufactured with one longitudinal seam formed by high-frequency induction welding without the addition of filler metal. Although this seam often has a relatively low profile, the seam can nonetheless extend at least partially into the inner diameter of the coiled tubing. As a result, said weld seam can impede the ability of a downhole tool (which is typically connected to the distal end of the coiled tubing using a coil connector device) to be joined to the coiled tubing forming a fluid pressure-tight seal. As such, it is frequently beneficial to remove a portion of this seam or "dress off" the distal end of the coiled tubing in order to create a substantially smooth inner surface of said coiled tubing in order to promote a "flush" or fluid pressure seal between a downhole tool (or coil connector) and said tubing. In many cases, such dressing off must be done in the field immediately prior to performing desired coiled tubing operations.

Thus, there is a need for a method and apparatus for removing at least some portion of a weld seam, or other obstruction or debris, from the inner and/or outer surfaces of a section of coiled tubing. The method and apparatus should be relatively inexpensive, easy to use and effective, thereby allowing use in the field, or in a shop or other facility.

SUMMARY OF THE INVENTION

The present invention comprises a seam dressing tool assembly for use in beneficially removing a weld seam on a section of coiled tubing, and thus, preparing an inner and/or outer surface of said coiled tubing for an effective seal with a coil connector, or any other similar connecting device. In a preferred embodiment, the seam dressing tool of the present invention generally comprises a receiver, or sleeve, member, a drive shaft member, a drive collar member, a seal member, and a bit member.

In a preferred embodiment, the seam dressing tool of the present invention comprises a drive shaft member. Said drive shaft comprises a substantially cylindrical body member, having a first end and a second end and an outer diameter. Said first end of the shaft member comprises a receiving end for a drive motor mechanism, or any other similar mechanism, such as, for example, an air winch, and said second end of the shaft member allows for a connection with a bit member. Said bit member comprises a plurality of teeth-like projections located along an outer surface of said bit member for use in beneficially removing a weld seam from an inner surface of a section of coiled tubing. Thus, said bit member is threadably connected to second end of drive shaft member and is slidably disposed and received within a distal end section of coiled tubing. Thus, as said bit member and said drive shaft member are axially moving within said coiled tubing, said bit member is powered by said drive motor mechanism, thereby rotating said bit member about its axis, and thus removing said weld seam from within said coiled tubing.

Additionally, the seam dressing tool of the present invention comprises a drive collar member for use in maintaining control over said shaft member, and thus, keeping said shaft member substantially stable while said seam dressing tool assembly is in operation. Said drive collar comprises a first end and a second end, wherein said first end allows for said drive shaft to be received within said drive collar and said second end of said drive collar attachably connects to said receiver member. Said receiver member comprises a substantially cylindrical body member having a first end, a second end, an inner surface, and an outer surface, thus defining an inner chamber, wherein said first end attachably connects to said drive collar and said second end attachably connects to a receiver cap. Said receiver cap beneficially allows said receiver, and thus, said seam dressing assembly of the present invention, to connect to a distal end of said coiled tubing.

In a preferred embodiment, the seam dressing tool of the present invention further comprises a first seal member and a second seal member, or an O-ring, for use in preventing any excess fluid from exiting said coiled tubing while said seam dressing assembly is in operation. Said first seal member is adjacently disposed around said outer surface of said drive shaft and is positioned adjacently to said second end of said drive collar. Further, an outer surface of said first seal member is adjacently disposed about and positioned against said inner surface of said receiver member. As a result, said first seal member creates a plug or barrier in order to prevent any excess fluid from exiting said coiled tubing. Said second seal member, or O-ring, and at least one O-ring spacer are disposed within a groove between said receiver member and said receiver cap, and thus, effect a seal between said receiver cap and said receiver member. As a result, said O-ring is held in place using said O-ring spacers and a threaded connection between said receiver member and said receiver cap.

In a preferred embodiment, when said seam dressing assembly is in operation, a distal end of a section of coiled tubing is received within a second end of a receiver cap, wherein said receiver cap attachably connects said seam dressing assembly to said coiled tubing. Said drive shaft is attachably connected to a first end of said receiver member by way of said drive collar member. Thus, said drive collar member is threadably connected to said receiver member, thereby stabilizing said drive shaft during operation. Further, when said drive shaft is connected to said receiver, a rubber seal member, or O-ring, is adjacently disposed between said drive collar member and said receiver member, thereby creating a plug in order to prevent any fluid from exiting said coiled tubing.

A user is then able to manually hold said receiver in order to provide stability to said seam dressing assembly, while a drive motor mechanism is attachably connected to said first end of said drive shaft member. Said drive motor mechanism is then able to power and thus apply a relative force to said drive shaft member, and thus ultimately, to said bit member. When said drive shaft axially extends into said distal end of said coiled tubing, said bit member extends into and through said receiver, and thus, into an inner chamber of said distal end of said coiled tubing. As a result, said bit member is able to rotate about its axis, contact the inner surface of said coiled tubing, and thus remove a weld seam along said inner surface of said coiled tubing. Therefore, said bit member is further able to clean up any rust, debris, or any other deviations from within said inner surface of said coiled tubing. After said weld seam has been removed, said seam dressing assembly of the present invention can be disconnected and removed from said distal end of said coiled tubing, and then any desired coil connector can be attached to said coiled tubing, as necessary.

Additionally, in a preferred embodiment, the seam dressing assembly of the present invention further comprises an inner diameter (ID) beveler apparatus for use in removing any excess deviations from within a section of coiled tubing prior to the attachment of the seam dressing tool assembly of the present invention. Thus, said ID beveler apparatus is generally used prior to said seam dressing assembly of the present invention. Said ID beveler apparatus generally comprises a beveler drive shaft, a beveler collar, and a beveling cone. The ID beveler apparatus can attach to a distal end of a section of coiled tubing and beneficially trim an internal diameter of said coiled tubing to a desired size by way of said beveling cone.

In a preferred embodiment, when said ID beveler apparatus is in operation, if said coiled tubing is to be connected to an inner diameter connector, or any other similar tool, said ID beveler apparatus can be attached to a distal end of said coiled tubing, trim said inner diameter of said coiled tubing as needed, and thus prepare said distal end of said coiled tubing to be connected to said seam dressing tool assembly of the present invention in order to further remove a weld seam from within said inner surface of said coiled tubing. After said seam dressing tool assembly is disconnected from said coiled tubing and said weld seam has been removed, said coiled tubing can then be connected directly to an inner diameter connector, as necessary.

BRIEF DESCRIPTION OF THE DRAWINGS/FIGURES

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

DETAILED DESCRIPTION OF A PREFERRED EMBODIMENT

Figure 1:
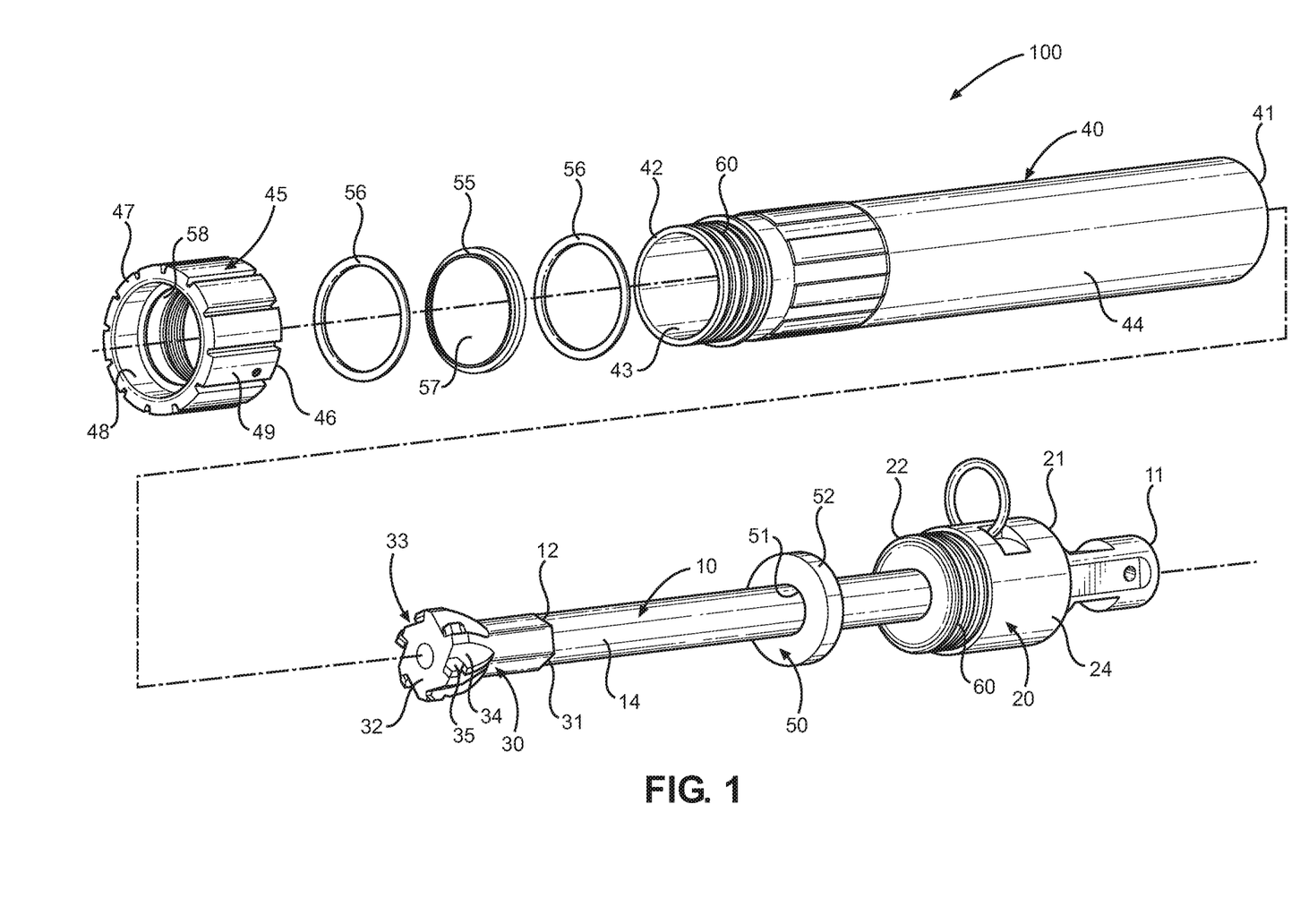
FIG. 1 depicts an exploded perspective view of a preferred embodiment of a seam dressing tool assembly of the present invention.

Referring to the drawings, FIG. 1 depicts an exploded view of a seam dressing tool assembly 100 of the present invention. In a preferred embodiment, seam dressing tool assembly 100 generally comprises a drive shaft member 10, a drive collar member 20, a bit member 30, and a receiver member 40. Drive shaft member 10 comprises a substantially cylindrical rod-like configuration, having a first end 11, a second end 12, and an outer diameter, or surface 14. First end 11 of drive shaft 10 comprises a receiving end for a drive motor mechanism (although not illustrated in FIG. 1), or any other similar mechanism or power source, such as, for example, an air wrench, and second end 12 of drive shaft 10 comprises a receiving end, or a connection point, for bit member 30.

In a preferred embodiment, outer diameter 14 of drive shaft 10 comprises a plurality of circular-shaped grooves 16 that surround an entire outer circumference or surface 14 of shaft member 10 and that are equidistantly spaced apart along outer surface 14 of shaft member 10. As a result, grooves 16 provide depth markings in order for a user to visually determine how far drive shaft 10, and thus, seam dressing tool 100, is being slidably disposed and extending within a section of coiled tubing.

Drive collar member 20 comprises a means for maintaining stability within seam dressing tool 100, and thus, keeping drive shaft 10 substantially controlled. Drive collar 20 comprises a first end 21, a second end 22, an inner diameter, or surface 23, and an outer diameter, or surface 24, wherein drive shaft 10 is received within first end 21 of drive collar 20 and second end 22 of drive collar 20 comprises a threaded connection 60, or any other similar attachment means, in order to attachably connect drive collar 20 to receiver member 40. Thus, drive collar 20 threadably attaches into receiver member 40 in order to stabilize drive shaft 10 as drive shaft 10 is being powered through receiver member 40.

Although not visible in FIG. 1, drive collar 20 further comprises a bushing member 25, wherein bushing member 25 comprises a substantially cylindrical-shaped configuration, having a first end 26, a second end 27, an inner diameter, or surface 28, and an outer diameter, or surface 29. Outer surface 29 of bushing member 25 adjacently aligns inner surface 23 of drive collar 20, and inner surface 28 of bushing member 25 adjacently aligns outer surface 14 of drive shaft 10. As a result, bushing 25 provides a sleeve for use in beneficially lining inner surface 23 of drive collar 20, thus protecting drive collar 20 from any movement or rotation of drive shaft 10, thereby absorbing any frictional forces from movement or rotation from drive shaft 10 when seam dressing tool 100 is in operation.

Bit member 30 comprises a first end 31 and a second end 32, wherein first end 31 is received within second end 12 of drive shaft 10. Thus, bit member 30 is attachably connected to drive shaft 10 via a threaded connection 60, or any other similar attachment means. Second end 32 of bit member 30 comprises a substantially jagged head member 33 having a substantially rough outer surface for use in removing a weld seam, or any other debris, from within a section of coiled tubing. Head member 33 has an outer diameter that is approximately slightly less than an inner diameter of a section of coiled tubing, thereby allowing head member 33 to be received within and extend through said coiled tubing, and thus, axially move along inner surface of said coiled tubing. Further, head member 33 comprises a plurality of fan-like projections 34 equidistantly spaced along an outer surface of head member 33, wherein said projections 34 further comprise a plurality of teeth-like protrusions 35. Said teeth-like protrusions 35 thus allow bit member 30 to contact said inner surface of said coiled tubing, and thus, remove said weld seam from said inner surface of said coiled tubing.

Still referring to FIG. 1, in a preferred embodiment, receiver member 40 comprises a substantially cylindrical-shaped configuration, having a first end 41, a second end 42, an inner diameter, or surface 43, and an outer diameter, or surface 44. First end 41 of receiver member 40 comprises a threaded connection 60, or any other similar attachment means, wherein drive collar 20 can attachably connect to receiver member 40, and thus, ultimately allow drive shaft 10 and bit member 30 to be received within and extend through receiver member 40. Second end 42 of receiver member 40 comprises a threaded connection 60, or any other similar attachment means, for attachably connecting receiver member 40 to a receiver cap 45. Receiver cap 45 further comprises a first end 46, a second end 47, an inner surface 48, and an outer surface 49, wherein first end 46 of receiver cap threadably connects to second end 42 of receiver 40. Although not illustrated in FIG. 1, second end 47 of receiver cap 45 attachably connects seam dressing assembly 100 to a distal end of said coiled tubing.

Further, in a preferred embodiment, seam dressing assembly 100 comprises a first seal member 50. First seal member 50 comprises a substantially circular, ring-like device, having an inner diameter 51 and an outer diameter 52. Inner diameter 51 of first seal member 50 sits directly adjacent about outer surface 14 of drive shaft member 10. Outer diameter 52 of first seal member 50 sits directly adjacent along inner surface 43 of receiver member 40, thereby creating a seal in order to prevent any fluid from escaping or exiting from said coiled tubing when receiver 40 is attachably connected to said coiled tubing. As a result, first seal member 50 effects a seal between drive collar 20 and receiver member 40.

Additionally, seam dressing assembly 100 comprises a second seal member, or an O-ring 55, and at least one O-ring spacer 56. O-ring 55 and O-ring spacer 56 each comprise a substantially circular, ring-like device having an inner through bore 57. O-ring 55 and O-ring spacer 56 are disposed within a groove 58 of inner surface 48 of receiver cap 45 and effect a seal between receiver cap 45 and receiver member 40. Said O-ring 55 is held in place using said O-ring spacers 56 and said threaded connection 60 between said receiver member 40 and said receiver cap 45.

Figure 2:
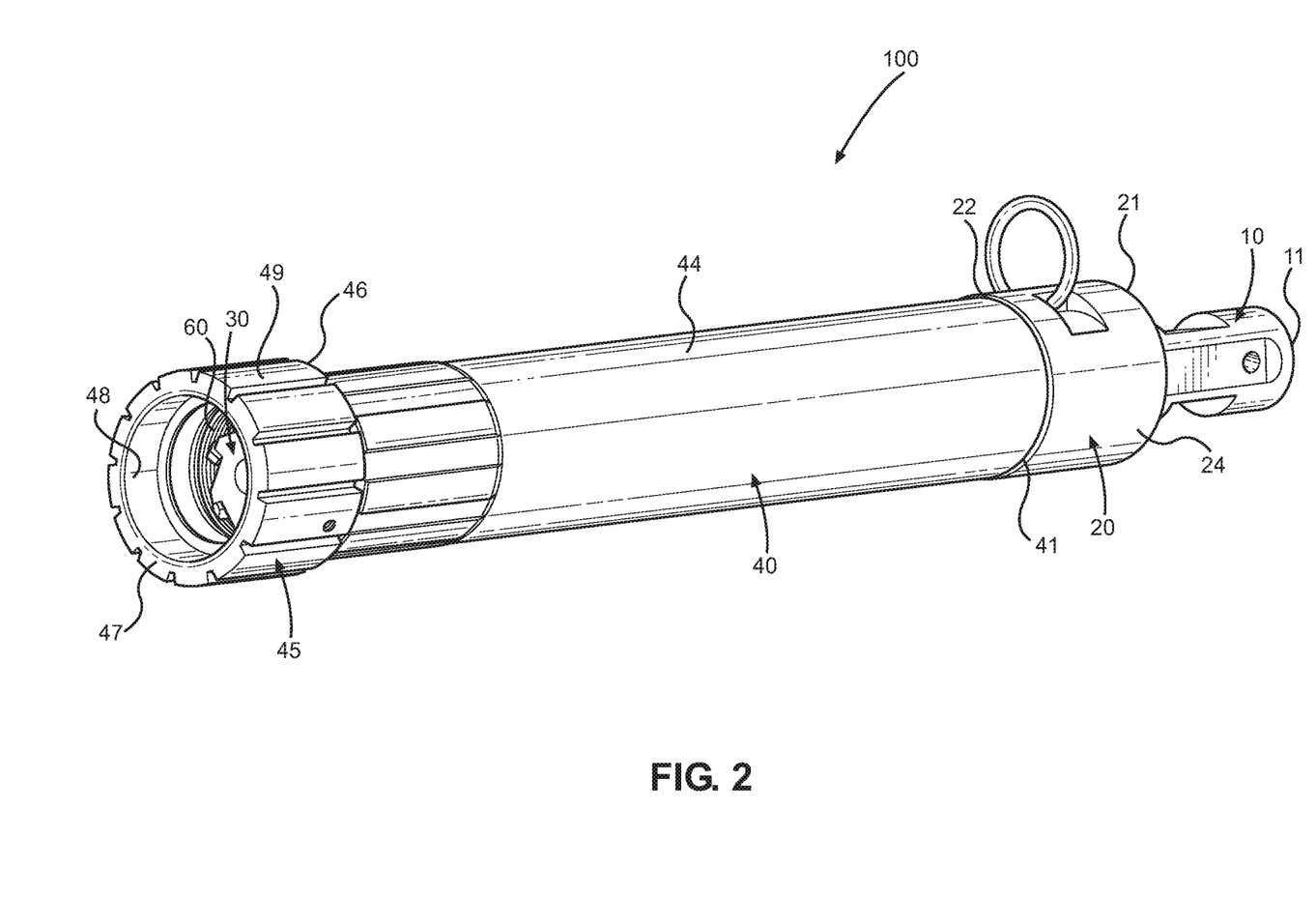
FIG. 2 depicts a side perspective view of a preferred embodiment of a seam dressing tool assembly of the present invention in an assembled configuration.

FIG. 2 depicts a perspective view of seam dressing assembly 100 of the present invention in an assembled configuration. In a preferred embodiment, seam dressing assembly 100 beneficially comprises drive shaft 10, drive collar 20, bit member 30, and receiver 40. In a preferred embodiment, drive shaft 10 and bit member 30 are attached in axial alignment with each other, and drive collar 20 and receiver 40 are attached in axial alignment with each other. Although not illustrated in FIG. 2, drive shaft 10 comprises a substantially cylindrical body member, having first end 11, second end 12, and outer diameter 14, wherein first end 11 of drive shaft 10 comprises a receiving end for a drive motor mechanism, and second end 12 of drive shaft 10 comprises a connection point for bit member 30.

Drive collar 20 comprises first end 21, second end 22, inner diameter 23, and outer diameter 24, wherein drive shaft 10 is received within first end 21 of drive collar 20, and second end 22 of drive collar 20 comprises threaded connection 60 in order to attachably connect drive collar 20 to receiver member 40. Thus, drive collar 20 attachably screws into receiver member 40 in order to stabilize drive shaft 10 as drive shaft 10 is being powered through receiver member 40, therefore driving bit member 30 into and through receiver member 40.

Still referring to FIG. 2, receiver member 40 comprises a substantially cylindrical-shaped body member, having first end 41, second end 42, inner surface 43, and outer surface 44, wherein first end 41 of receiver member 40 comprises threaded connection 60 for drive collar 20 to attachably connect to receiver member 40, and thus, ultimately allow drive shaft 10 and bit member 30 to be slidably disposed within and extend through receiver member 40. Second end 42 of receiver member 40 comprises threaded connection 60 for attachably connecting to first end 46 of receiver cap 45. Receiver cap 45 comprises first end 46, second end 47, inner diameter 48, and outer diameter 49, wherein first end 46 of receiver cap threadably connects to second end 42 of receiver 40, and second end 47 of receiver cap 45 attachably connects seam dressing assembly 100 to a distal end of coiled tubing (although not illustrated in FIG. 2).

Figure 3:
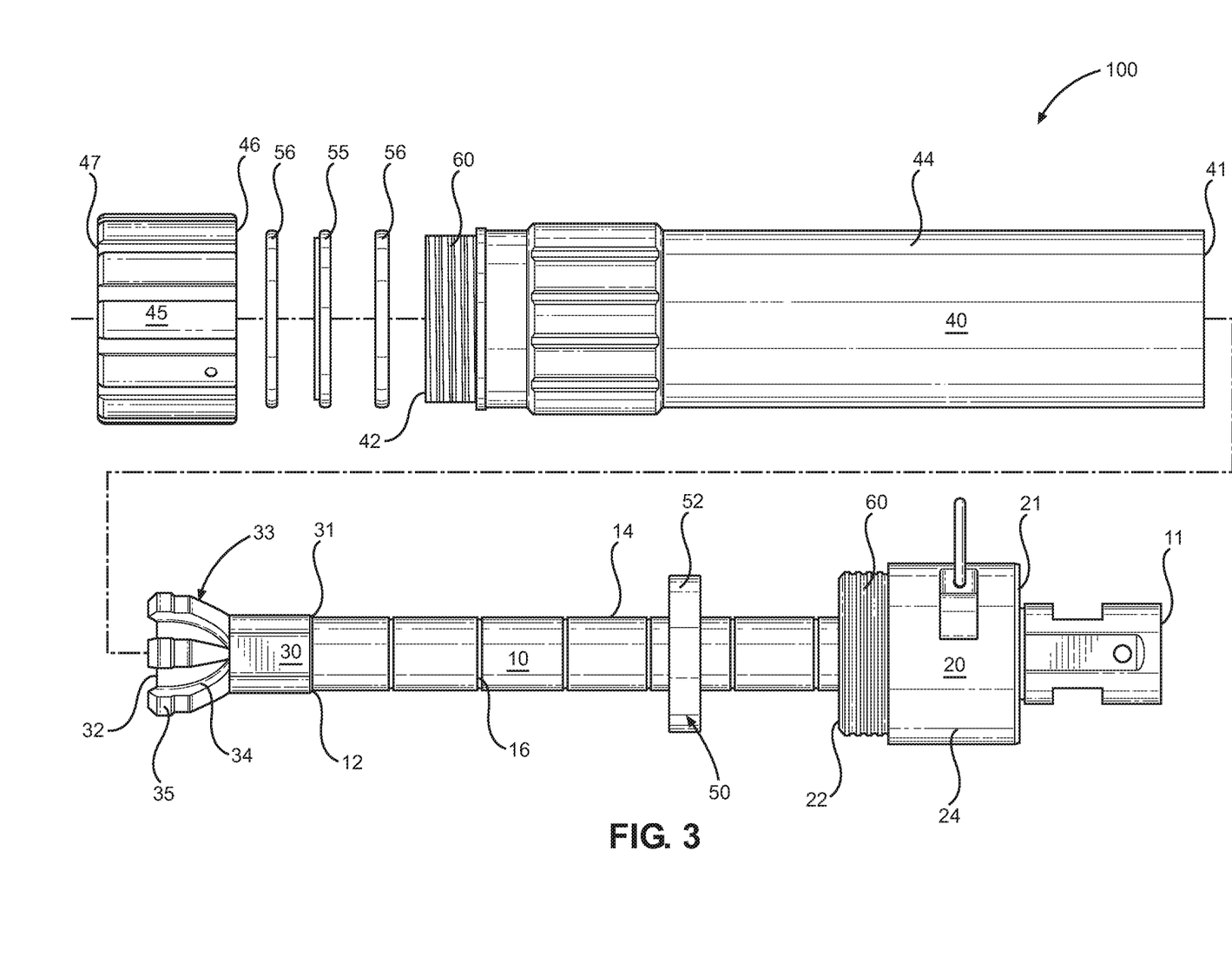
FIG. 3 depicts an exploded side view of a preferred embodiment of a seam dressing tool assembly of the present invention.
Figure 4:
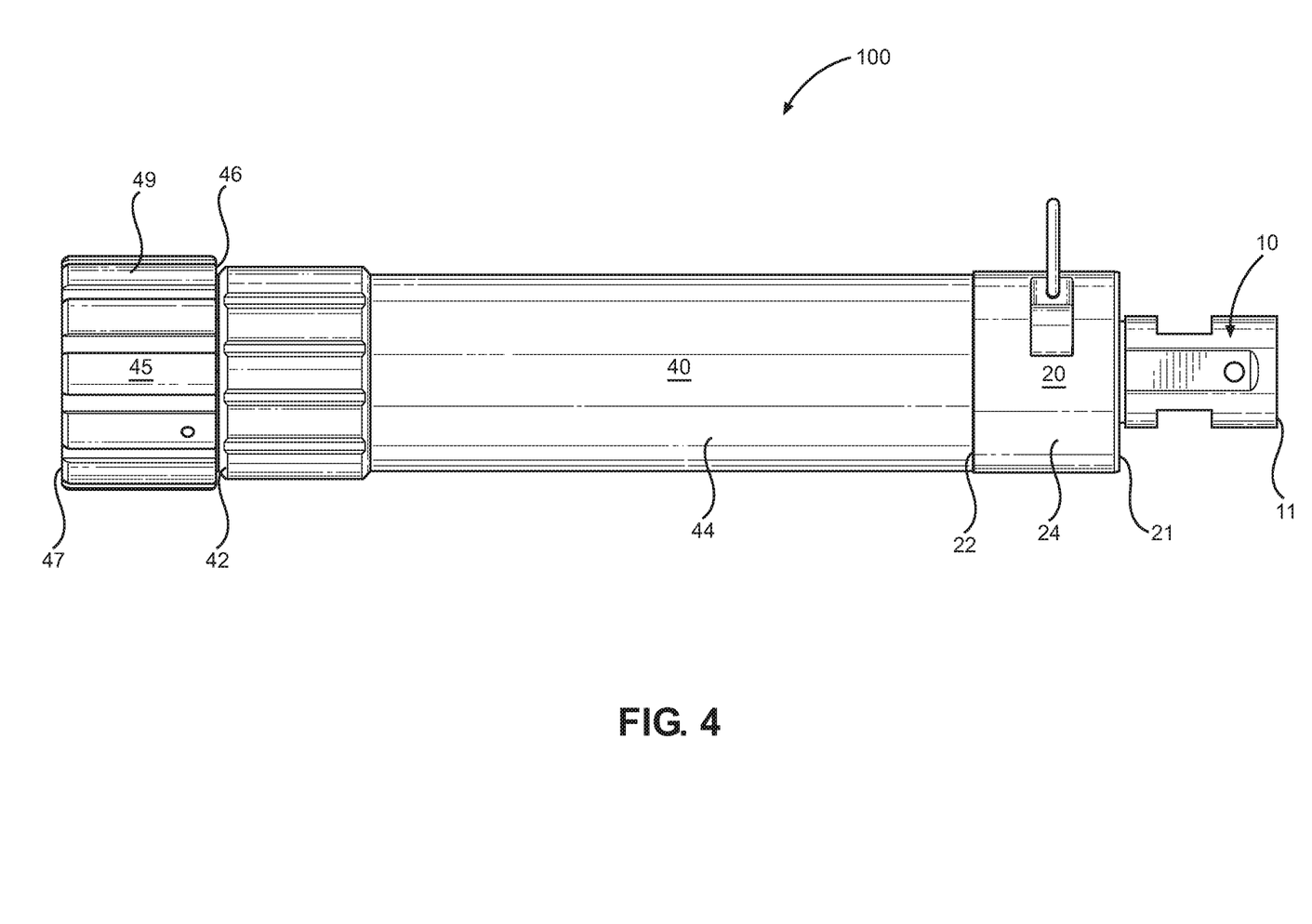
FIG. 4 depicts a side view of a preferred embodiment of a seam dressing tool assembly of the present invention in an assembled configuration.

FIG. 3 depicts a side exploded view of seam dressing assembly 100, while FIG. 4 depicts a side view of seam dressing assembly 100 of the present invention in an assembled configuration comprising drive shaft 10, drive collar 20, bit member 30, receiver member 40, and seal member 50.

Referring to FIGS. 3 and 4, first end 11 of drive shaft 10 comprises a receiving end for a drive motor mechanism (although not illustrated in FIG. 3 or 4), or any other similar mechanism, such as, for example, an air wrench, and second end 12 of drive shaft 10 comprises a receiving end, or a connection point, for bit member 30. Drive shaft 10 is received within an inner chamber of drive collar 20, wherein drive collar 20 further comprises bushing 25 for use in beneficially lining inner surface 23 of drive collar 20, thereby protecting drive collar 20 from any movement or rotational forces from drive shaft 10.

Additionally, drive collar 20 attachably connects to first end 41 of receiver member 40 by way of threaded connection 60, or any other similar attachment means, and thus, ultimately allowing drive shaft 10 and bit member 30 to be received within and extend through receiver member 40. Second end 42 of receiver member 40 comprises threaded connection 60, or any other similar attachment means, for attachably connecting receiver member 40 to receiver cap 45, wherein first end 46 of receiver cap threadably connects to second end 42 of receiver 40. Moreover, although not depicted in FIG. 3 or 4, second end 47 of receiver cap 45 attachably connects and secures seam dressing assembly 100 to a section of coiled tubing.

Further, in a preferred embodiment, seam dressing assembly 100 comprises first seal member 50, wherein first seal member 50 further comprises a substantially circular, ring-like device, having inner diameter 51 and outer diameter 52. Inner diameter 51 of first seal member 50 sits directly adjacent about outer surface 14 of drive shaft member 10. Outer diameter 52 of first seal member 50 sits directly adjacent to inner surface 43 of receiver member 40, thereby creating a seal in order to prevent any fluid from escaping or exiting from said coiled tubing when receiver 40 is attachably connected to said coiled tubing. As a result, first seal member 50 effects a seal between drive collar 20 and receiver member 40.

Additionally, as shown in FIG. 3, seam dressing assembly 100 comprises second seal member 55, or an O-ring, and O-ring spacer 56. O-ring 55 and O-ring spacer 56 each comprise a substantially circular, ring-like device having inner through bore 57. O-ring 55 and O-ring spacer 56 are disposed within groove 58 of inner surface 48 of receiver cap 45 and effect a seal between receiver cap 45 and receiver member 40. Said O-ring 55 is held in place using said O-ring spacers 56 and said threaded connection between said receiver member 40 and said receiver cap 45.

Figure 5:
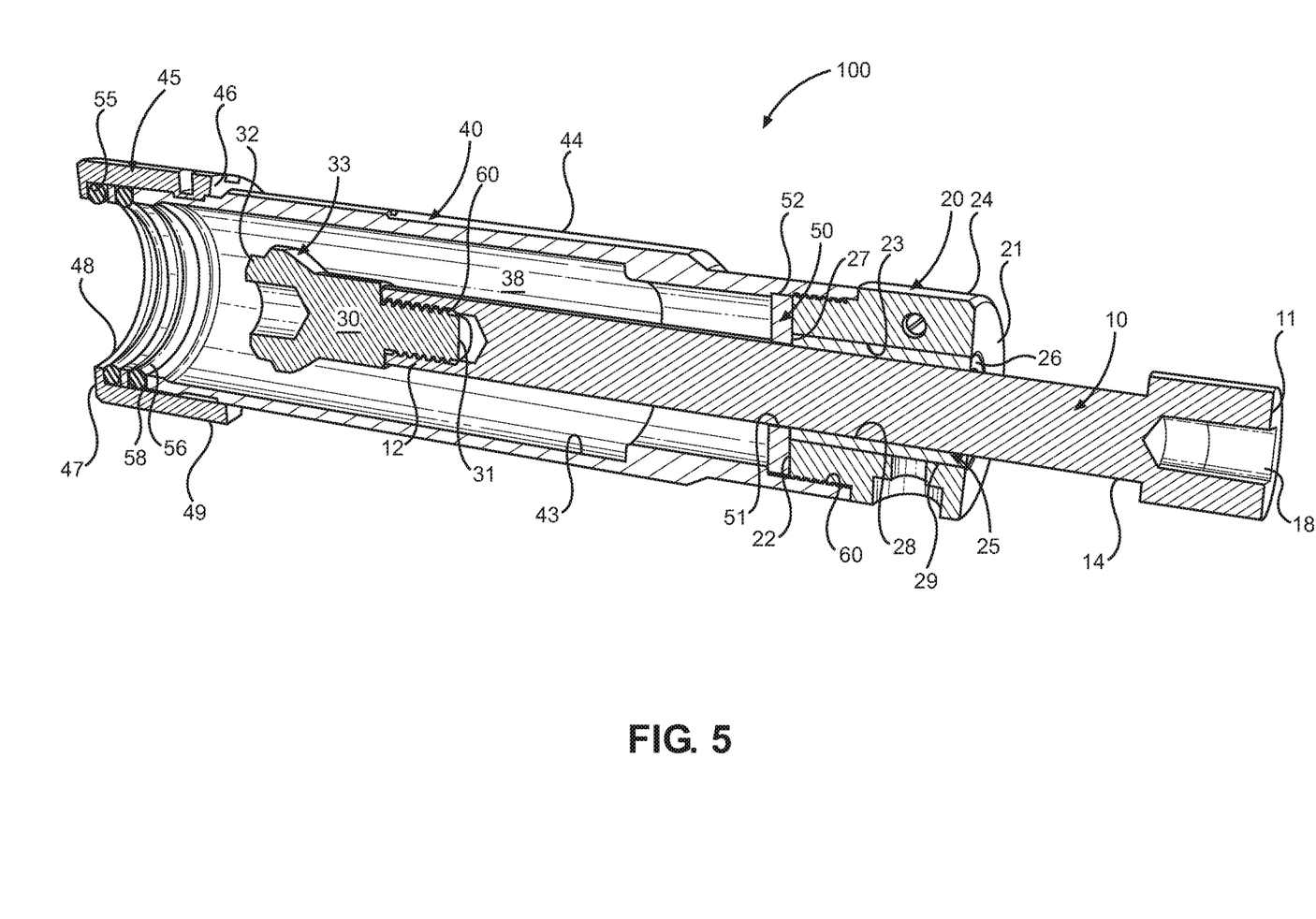
FIG. 5 depicts a sectional view of a preferred embodiment of a seam dressing tool assembly of the present invention.

FIG. 5 depicts a sectional view of a preferred embodiment of seam dressing assembly 100 of the present invention in an assembled configuration, generally comprising receiver member 40, drive collar 20, drive shaft 10, and bit member 30. Receiver member 40 generally comprises a substantially cylindrical body member having an internal chamber 38 defining inner surface 43. First end 41 of receiver member 40 is attached to drive collar 20, while second end 42 of receiver member 40 is attached to receiver cap 45. Said receiver member 40 and said drive collar 20 can comprise threaded connection 60 or other conventional connection means designed for attachably connecting said receiver member 40 to said drive collar 20. Thus, receiver member 40 and drive collar 20 are joined together in an opposing end-to-end relationship. Further, said receiver cap 45 and said receiver member 40 can comprise threaded connection 60 or other conventional connection means designed for attachably connecting said receiver cap 45 to said receiver member 40. Thus, receiver member 40 and receiver cap 45 are joined together in an opposing end-to-end relationship.

Drive collar member 20 generally comprises a substantially cylindrical body member having an internal chamber defining inner surface 23. Further, drive collar 20 comprises bushing member 25 that is concentrically disposed within said inner surface 23 of drive collar 20 for use in protecting drive collar 20 and drive shaft 10 from any frictional forces or movement while seam dressing assembly 100 is in operation. Bushing member 25 comprises a substantially cylindrical-shaped configuration, having first end 26, second end 27, inner surface 28, and outer surface 29. Outer surface 29 of bushing member 25 adjacently aligns inner surface 23 of drive collar 20, and inner surface 28 of bushing member 25 adjacently aligns outer surface 14 of drive shaft 10. As a result, bushing 25 provides a sleeve for use in beneficially lining inner surface 23 of drive collar 20, thus protecting drive collar 20 from any movement or rotation of drive shaft 10, thereby absorbing any frictional forces from movement or rotation from drive shaft 10 when seam dressing tool 100 is in operation.

Drive shaft member 10 comprises a substantially rod-like member having first end 11 and second end 12. First end 11 comprises a connection point 18 for a drive motor mechanism, while second end 12 comprises threaded connection 60 for bit member 30. Drive shaft 10 extends through said drive collar 20 and is at least partially concentrically disposed within said internal chamber 38 of receiver member 40. A first seal member 50 is disposed about an outer surface 14 of drive shaft and positioned within a groove at the threaded connection point between receiver member 40 and drive collar 20. Seal member 50 effects a seal between drive collar 20 and receiver member 40, thereby preventing any fluid from exiting said seam dressing assembly 100 of the present invention while said assembly 100 is in operation.

Still referring to FIG. 5, first end 31 of bit member 30 can be threadably connected to second end 12 of drive shaft member 10, wherein bit member 30 is joined to drive shaft member 10 in an opposing end-to-end relationship. Second end 32 of bit member comprises head member 33 for use in removing a weld seam from within a section of coiled tubing. Head member 33 has an outer diameter that is approximately slightly less than an inner diameter of a section of coiled tubing, thereby allowing head member 33 to be received within and extend through said coiled tubing, and thus, axially move along inner surface of said coiled tubing. Further, head member 33 comprises a plurality of fan-like projections 34 equidistantly spaced along an outer surface of head member 33, wherein said projections 34 further comprise teeth-like protrusions 35 located along an outer surface of said projections 34. Said protrusions 35 thus allow bit member 30 to be able to abrasively contact said inner surface of said coiled tubing, thereby removing said weld seam, or any other debris or deviations, from said inner surface of said coiled tubing.

Figure 6:
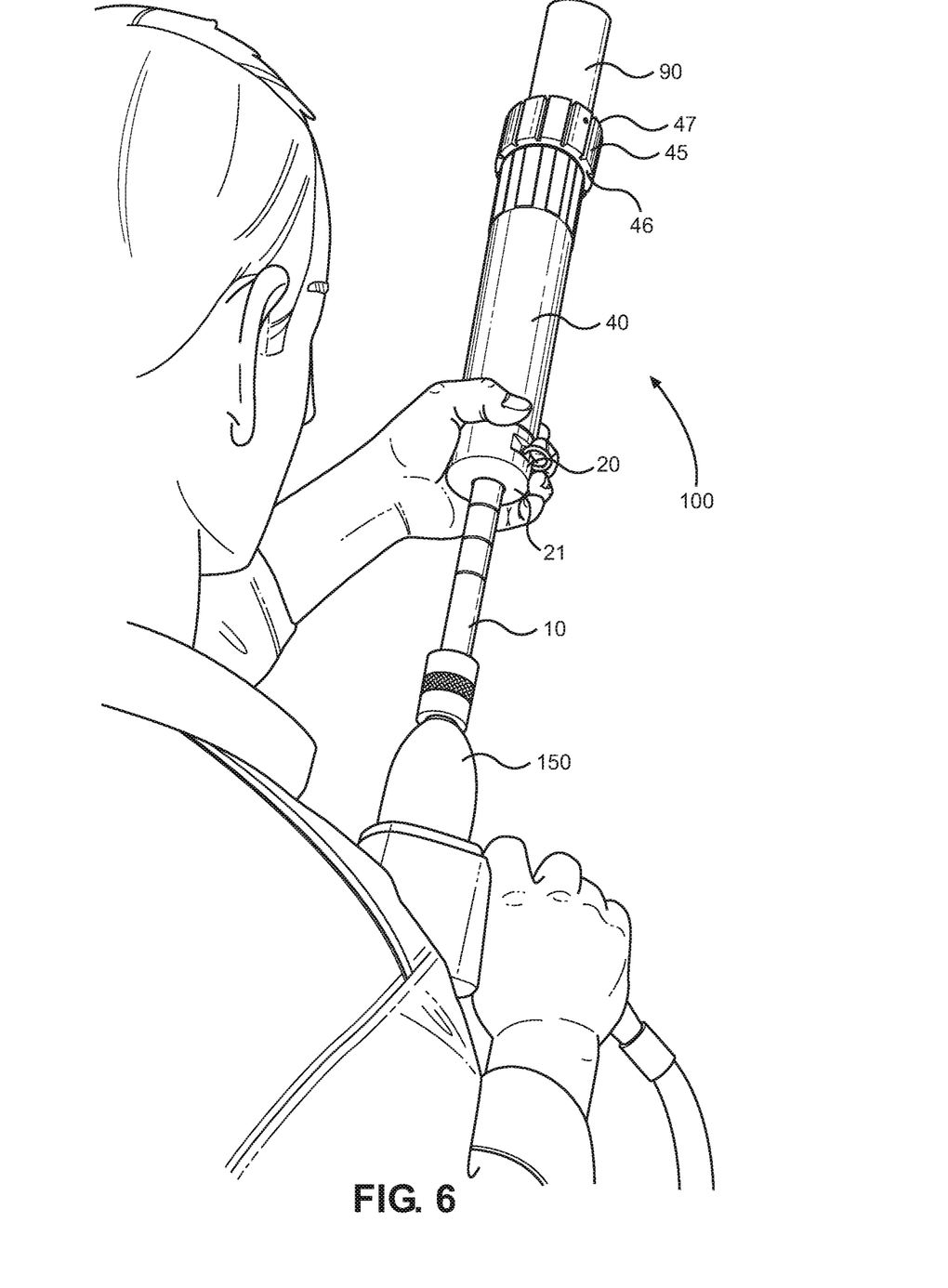
FIG. 6 depicts a side view of a preferred embodiment of a seam dressing tool assembly of the present invention in operation.

FIG. 6 depicts a perspective view of seam dressing assembly 100 of the present invention in operation. When in operation, a distal end of a section of coiled tubing 90 is received within second end 47 of receiver cap 45, and thus, coiled tubing 90 is attachably connected to receiver cap 45 by way of threaded connection 60, or via any other similar attachment means. Drive shaft 10 is attachably connected to first end 41 of receiver member 40 by way of drive shaft collar 20. Drive shaft collar 20 is attachably connected to first end 41 of receiver member 40 by way of said threaded connections 60, thereby stabilizing drive shaft 10 during a seam dressing operation. When drive shaft collar 20 is connected to receiver member 40, seal member 50 is also received within receiver member 40, thereby creating a plug in order to prevent any fluid from exiting coiled tubing 90 while seam dressing tool 100 is in operation.

In a preferred embodiment, a user is able to manually hold receiver 40 in order to provide stability to said tool 100, while drive motor mechanism 150 is attachably connected to said first end 11 of said drive shaft member 10. Drive motor mechanism 150 is then able to power and thus apply a relative force to drive shaft member 10, and thus ultimately, to said bit member 30, as drive shaft member 10 and bit member 30 are being powered into coiled tubing 90. As a result, said power provided by said drive motor mechanism 150 enables drive shaft 10 to slidably extend through receiver member 40 and thus through said coiled tubing 90, ultimately allowing bit member 30 to extend through receiver member 40 and through coiled tubing 90.

Further, when drive shaft 10 axially moves into and extends through coiled tubing 90, bit member 30 axially extends into and through receiver member 40, and thus, into and through an inner chamber of coiled tubing 90. Bit member 30 is then able to rotate about its axis, contact the inner surface of said coiled tubing, and remove weld seam 95 within the inner surface of coiled tubing 90. Therefore, bit member 30 is further able to clean up any rust, or any other similar deviations from within inner surface of coiled tubing 90. After weld seam 95 has been removed, seam dressing tool 100 can be disconnected and removed from said distal end of coiled tubing 90, whereby any desired coil connector can then be attachably connected to coiled tubing 90, as necessary.

Figure 7:
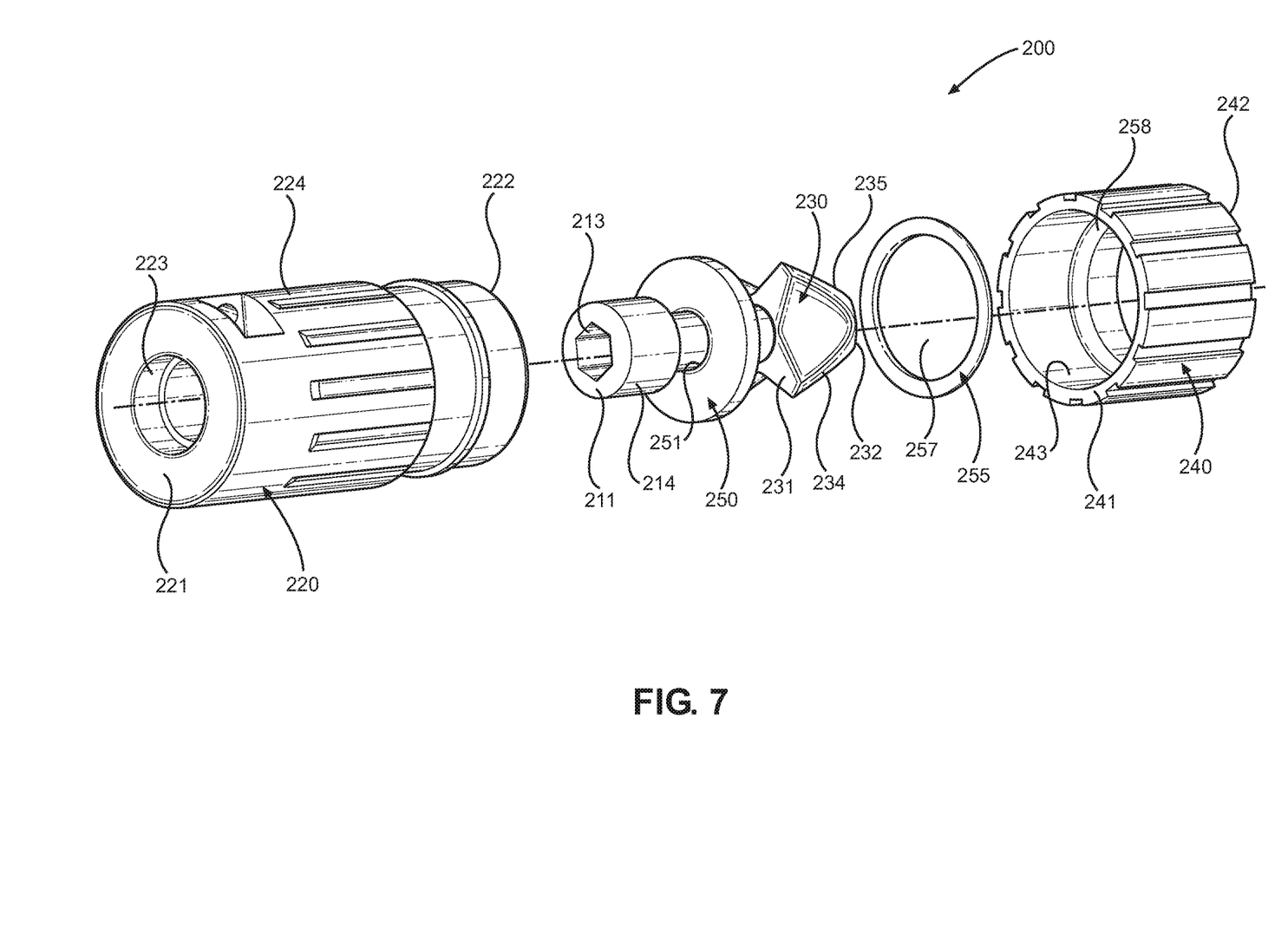
FIG. 7 depicts an exploded perspective view of a preferred embodiment of an inner diameter beveler apparatus of the present invention.

FIG. 7 depicts a preferred embodiment of an inner diameter (ID) beveler apparatus 200 for use in removing any excess deviations from within a section of coiled tubing prior to the attachment of seam dressing assembly 100 of the present invention. ID beveler apparatus 200 generally comprises a beveler drive shaft member 210, a beveler collar member 220, and a beveling cone member 230. Beveler drive shaft member 210 comprises a substantially cylindrical body member, having a first end 211, a second end 212, an inner surface 213, and an outer surface 214. First end 211 of beveler drive shaft 210 comprises a receiving end for a drive motor mechanism (although not illustrated in FIG. 7), or any other similar mechanism, such as, for example, an air wrench, and second end 212 of drive shaft 210 comprises a receiving end, or a connection point, for beveling cone member 230.

Beveler collar member 220 comprises a means for maintaining stability within ID beveler apparatus 200, and thus, keeping beveler drive shaft 210 substantially controlled. Beveler drive collar 220 comprises a first end 221, a second end 222, an inner surface 223, and an outer surface 224, wherein beveler drive shaft 210 is received within first end 221 of beveler drive collar 220 and second end 222 comprises a threaded connection, or any other similar attachment means, in order to attachably connect beveler drive collar 220 to a beveler cap member 240. Thus, beveler drive collar 220 attachably screws into a first end 241 of beveler cap member 240 in order to stabilize beveler drive shaft 210 as beveler drive shaft 210 is being pushed through cap member 240, thereby driving and extending beveler cone 230 into and through cap member 240.

Although not illustrated in FIG. 7, beveler drive collar 220 further comprises a beveler bushing member 225, wherein beveler bushing member 225 comprises a substantially cylindrical-shaped configuration, having a first end 226, a second end 227, an inner surface 228, and an outer surface 229. Outer surface 229 of beveler bushing member 225 adjacently aligns inner surface 223 of beveler drive collar 220, thereby providing a sleeve for use in lining inner surface 223 of beveler drive collar 220, and thus protecting beveler drive collar 220 from any movement or rotational forces from beveler drive shaft 210. Further, inner surface 228 of beveler bushing member 225 adjacently aligns outer surface 214 of beveler drive shaft 210, thereby absorbing any frictional forces from any movement or rotation from beveler drive shaft 210 when ID beveler apparatus 200 is in operation.

Still referring to FIG. 7, beveling cone member 230 comprises a substantially jagged head member 233 for use in beneficially trimming an internal diameter from within a section of coiled tubing. Beveling cone member comprises a first end 231 and a second end 232, wherein first end 231 attachably connects to second end 212 of beveler drive shaft 210. Thus, beveling cone member 230 is attachably connected to beveler drive shaft 210 via a threaded connection, or any other similar attachment means. Second end 232 of beveling cone member 230 comprises a substantially hexagonal shaped bore having an inner diameter.

Additionally, head member 233 comprises a plurality of fan-like projections 234 that are equidistantly spaced apart about an outer surface of head member 233. Fan-like projections 234 further comprise a plurality of teeth-like protrusions 235 located along an outer surface of said projections 234 that allow beveling cone member 230 to trim said inner diameter of said coiled tubing prior to attachment of seam dressing assembly 100. Thus, head member 233 has an outer diameter that is approximately slightly less than an inner diameter of a section of coiled tubing, thereby allowing head member 233 to be received within said coiled tubing, and thus, axially move along inner surface of said coiled tubing. As a result, said teeth 235 that are disposed along projections 234 are able to beneficially trim an internal diameter of said inner surface of said coiled tubing as head member 233 of beveling cone member 230 is slidably disposed within said coiled tubing.

Further, in a preferred embodiment, ID beveler assembly 200 comprises a first seal member 250. First seal member 250 comprises a substantially circular, ring-like device, having an inner diameter 251 and an outer diameter 252. Inner diameter 251 of first seal member 250 defines an inner through bore and sits directly adjacent about outer surface 214 of beveler drive shaft member 210. Outer diameter 252 of first seal member 250 sits directly adjacent along inner surface 223 of beveler collar member 220, thereby preventing any fluid from escaping or exiting from said coiled tubing, and thus, ID beveler apparatus 200, when said apparatus 200 is attachably connected to said coiled tubing. Additionally, a second seal member, or O-ring, 255 comprises a substantially circular, ring-like device having an inner through bore 257. O-ring 255 is disposed within a groove 258 of an inner surface 243 of beveler cap member 240 and effects a seal between beveler cap 240 and beveler collar 220. Said O-ring 255 is further held in place using said threaded connection 260 between said beveler collar member 220 and said beveler cap member 240.

Figure 8:
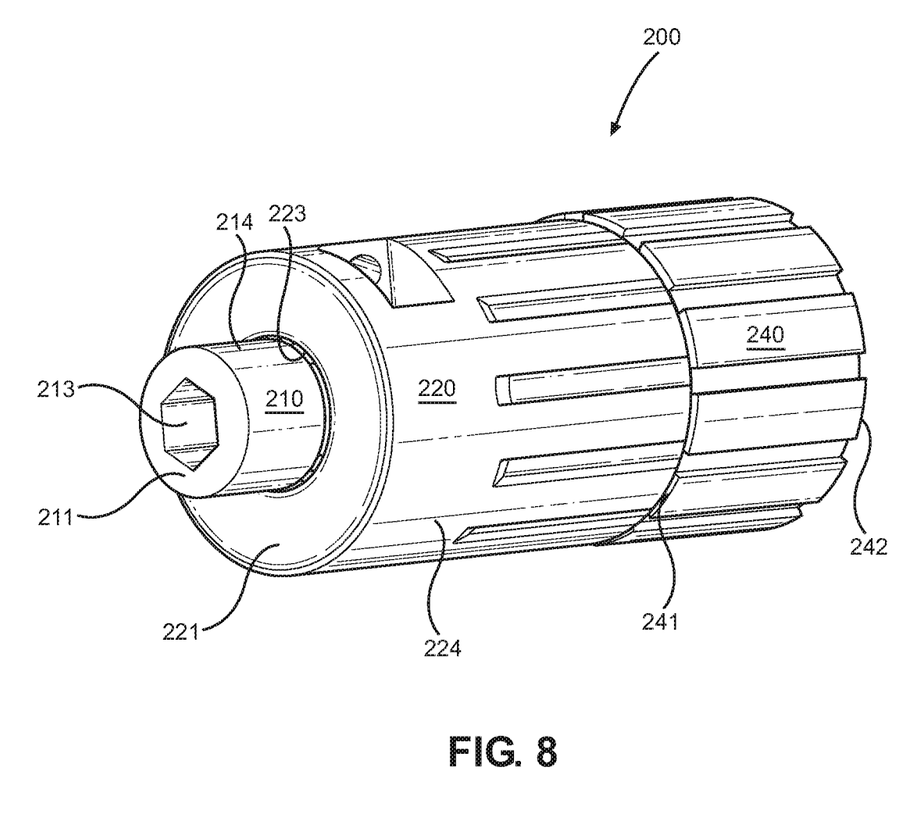
FIG. 8 depicts a side perspective view of a preferred embodiment of an inner diameter beveler apparatus of the present invention in an assembled configuration.

FIG. 8 depicts a preferred embodiment of an ID beveler assembly 200 of the present invention in an assembled configuration. When in operation, ID beveler apparatus 200 can attach to a distal end of a section of coiled tubing and beneficially trim an internal diameter to a desired size by way of beveling cone 230.

In a preferred embodiment, when in operation, if said coiled tubing is to be connected to an inner diameter connector, or any other similar tool, ID beveler apparatus 200 can be attached to said coiled tubing, trim said inner diameter of said coiled tubing as needed, and thus prepare said coiled tubing to be connected to said seam dressing tool assembly 100 of the present invention in order to further remove a weld seam from said inner surface of said coiled tubing. After said seam dressing tool assembly 100 is disconnected from said coiled tubing and said weld seam has been removed, said coiled tubing can then be connected directly to an inner diameter connector.

Figure 9:
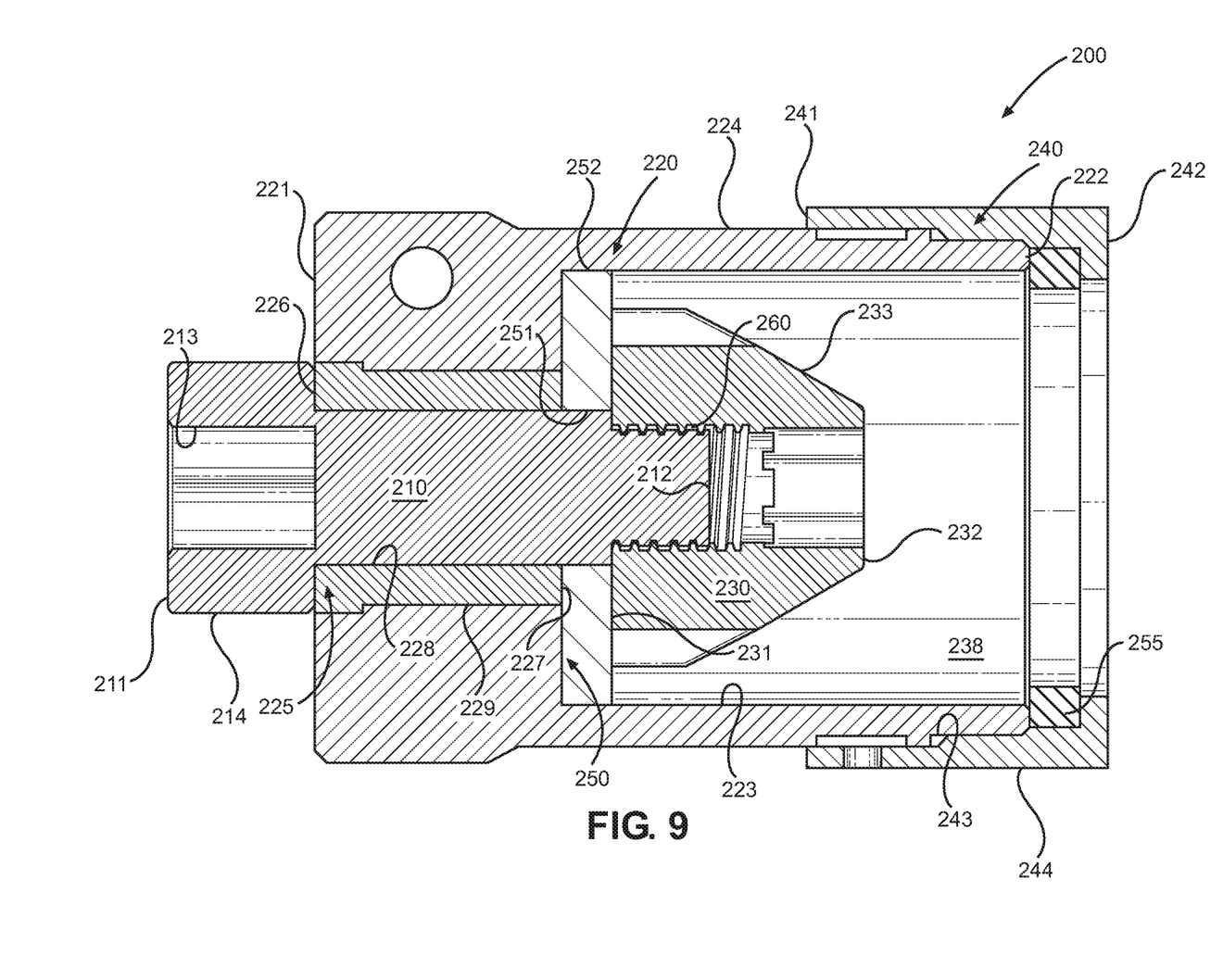
FIG. 9 depicts a side sectional view of a preferred embodiment of an inner diameter beveler apparatus of the present invention.

FIG. 9 depicts a side sectional view of a preferred embodiment of inner diameter beveler 200 of the present invention, generally comprising beveler drive collar 220, beveler drive shaft 210, and beveler cone member 230. Beveler drive collar member 220 generally comprises a substantially cylindrical body member having an internal chamber 238 defining inner surface 223. Further, beveler drive collar 220 comprises a bushing member 225 that is concentrically disposed within said inner surface 223 of beveler drive collar 220 for use in protecting beveler drive collar 220 and beveler drive shaft 210 from any frictional forces or movement while ID beveler assembly 200 is in operation.

Beveler bushing member 225 comprises a substantially cylindrical-shaped configuration, having first end 226, second end 227, inner surface 228, and outer surface 229. Outer surface 229 of beveler bushing member 225 adjacently aligns inner surface 223 of beveler drive collar 220, thereby providing a sleeve for use in lining inner surface 223 of beveler drive collar 220, and thus protecting beveler drive collar 220 from any movement or rotational forces from beveler drive shaft 210. Further, inner surface 228 of beveler bushing member 225 adjacently aligns outer surface 214 of beveler drive shaft 210, thereby absorbing any frictional forces from any movement or rotation from beveler drive shaft 210 when ID beveler apparatus 200 is in operation.

In a preferred embodiment, beveler drive shaft member 210 comprises a substantially rod-like member having first end 211 and second end 212. First end 211 comprises a connection point for a drive motor mechanism, while second end 212 comprises a threaded connection for beveler cone member 230. Beveler drive shaft 210 extends through said beveler drive collar 220 and is at least partially concentrically disposed within said internal chamber 238 of beveler drive collar 220. First seal member 250 is disposed about an outer surface 214 of beveler drive shaft 210 and positioned within a groove at the threaded connection point between beveler drive collar 220 and beveler cap member 240. Seal member 250 effects a seal between beveler drive collar 220 and beveler cap member 240, thereby preventing any fluid from exiting said ID beveler assembly 200 of the present invention while said assembly 200 is in operation.

Still referring to FIG. 9, first end 231 of beveling cone member 230 can be threadably connected to second end 212 of beveler drive shaft member 210, wherein beveling cone member 230 is joined to beveling drive shaft member 210 in an opposing end-to-end relationship. Second end 232 of beveling cone member 230 comprises head member 233 for use in removing a weld seam from within a section of coiled tubing. Head member 233 has an outer diameter that is approximately slightly less than an inner diameter of a section of coiled tubing, thereby allowing head member 33 to be received within and extend through said coiled tubing, and thus, axially move within inner surface of said coiled tubing. Further, head member 233 comprises a plurality of teeth-like projections 234 located along an outer surface of head member 233, thereby allowing beveling cone member 230 to be able to trim said internal diameter of said coiled tubing.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. An apparatus for use in removing a weld seam from within an inner surface or an outer surface of a distal end of a section of coiled tubing in preparation for a downhole operation in a production well comprising:
    a) a shaft member comprising a substantially cylindrical configuration having a first end, a second end, and an outer surface, wherein said first end is attachably connected to a drive motor mechanism, and said outer surface comprises a plurality of visual depth markings;
    b) a bit member comprising a substantially rough outer surface, wherein said bit member is attachably connected to said second end of said shaft member; and
    c) a sleeve member having a first end, a second end, and an inner surface defining an inner chamber, wherein said second end of said sleeve member attachably connects to said distal end of said coiled tubing, and said shaft member and bit member are received within said inner chamber.

2. The apparatus of claim 1, further comprising a collar member, wherein said collar member has a first end, a second end, and an inner surface defining an inner chamber, and wherein said collar member maintains said shaft member in a substantially stable position.

3. The apparatus of claim 2, wherein said second end of said collar member attachably connects to said first end of said sleeve member.

4. The apparatus of claim 3, further comprising a fluid seal member, wherein said fluid seal member is disposed between said collar member and said sleeve member.

5. The apparatus of claim 1, further comprising an internal diameter beveler apparatus, wherein said internal diameter beveler apparatus comprises:
    a) a shaft member having a first end and a second end, wherein said first end of said shaft member is attachably connected to said drive motor mechanism;
    b) a cone member comprising a substantially rough outer surface, wherein said cone member is attachably connected to said second end of said shaft member; and
    c) a sleeve member having a first end, a second end, and an inner surface defining an inner chamber, wherein said second end of said sleeve member attachably connects to said distal end of said coiled tubing, and said shaft member and cone member are received within said inner chamber.

6. The apparatus of claim 2, wherein said shaft member is received within said first end of said collar member.

7. The apparatus of claim 4, further comprising a cap member, wherein said cap member comprises a first end, a second end, an inner surface, and an outer surface.

8. The apparatus of claim 7, wherein said first end of said cap member attachably connects to said second end of said sleeve member.

9. The apparatus of claim 8, wherein said second end of said cap member attachably connects to said distal end of said coiled tubing.

* * * * *